United States Patent
Chen (10) Patent No.: US 10,562,224 B2
(45) Date of Patent: Feb. 18, 2020

(54) HEAT-RESISTANT GLUE ROLL STRUCTURE WITH DISCHARGE THROUGH HOLES

(71) Applicant: RAYSON ELECTRICAL MFG. LTD., Foshan (CN)

(72) Inventor: Yongjun Chen, Foshan (CN)

(73) Assignee: RAYSON ELECTRICAL MFG. LTD., Foshan (CN)

( * ) Notice: Subject to any disclaimer, the term of this patent is extended or adjusted under 35 U.S.C. 154(b) by 183 days.

(21) Appl. No.: 15/538,109

(22) PCT Filed: Dec. 2, 2015

(86) PCT No.: PCT/CN2015/096197
§ 371 (c)(1),
(2) Date: Jun. 20, 2017

(87) PCT Pub. No.: WO2016/101775
PCT Pub. Date: Jun. 30, 2016

(65) Prior Publication Data
US 2017/0341292 A1    Nov. 30, 2017

(30) Foreign Application Priority Data

Dec. 22, 2014   (CN) .......................... 2014 1 0801159

(51) Int. Cl.
*B29C 63/00*   (2006.01)
*B32B 37/00*   (2006.01)
*B44C 7/04*    (2006.01)

(52) U.S. Cl.
CPC .......... *B29C 63/0004* (2013.01); *B29C 63/00* (2013.01); *B29C 63/0065* (2013.01); *B32B 37/0053* (2013.01); *B44C 7/04* (2013.01)

(58) Field of Classification Search
USPC .................. 118/246, DIG. 15, 244; 156/578
See application file for complete search history.

(56) References Cited

U.S. PATENT DOCUMENTS 3,720,808 A * 3/1973 Morrissey ........... B32B 37/0053
                                                219/469
2005/0217814 A1* 10/2005 Super ...................... B31F 1/126
                                                162/111

FOREIGN PATENT DOCUMENTS

CN     201142763 Y    10/2008
CN     104527047 A     4/2015
(Continued)

OTHER PUBLICATIONS

English Translation JP-06274058, Sep. 30, 1994. (Year: 1994).*
(Continued)

*Primary Examiner* — Yewebdar T Tadesse
(74) *Attorney, Agent, or Firm* — Anova Law Group, PLLC (57) ABSTRACT

The present invention discloses a heat-resistant glue roll structure with discharge through holes, which comprises a shaft sleeved with a high-temperature resistance insulation layer on the surface thereof. Multiple discharge through holes are formed on the high-temperature resistance insulation layer and communicate the outer and inner surface of the high-temperature resistant insulation layer. A heat-resistant soft glue outer layer is also sleeved on the surface of the high-temperature resistant insulation layer. Since the high-temperature resistant insulation layer is provided with the discharge through holes in the present invention, air bubbles generated both between the high-temperature resistant insulation layer and the heat-resistant soft glue outer layer and between the high-temperature resistant insulation layer and the shaft would be squeezed to move towards the discharge through holes and discharged therefrom. No air bubbles would be accumulated in the heat-resistant glue roll structure of the present invention. Therefore, the internal structure thereof is stable in structural connection and the struc- (Continued)

ture has long serving life, high stability and high safety and reliability.

8 Claims, 5 Drawing Sheets

(56) References Cited

FOREIGN PATENT DOCUMENTS

CN 204382652 U 6/2015
JP H06274058 A 9/1994

OTHER PUBLICATIONS

The World Intellectual Property Organization (WIPO) International Search Report for PCT/CN2015/096197 dated Mar. 9, 2016 5 Pages.

* cited by examiner

HEAT-RESISTANT GLUE ROLL STRUCTURE WITH DISCHARGE THROUGH HOLES

CROSS-REFERENCES TO RELATED APPLICATIONS

This application is a national stage application of PCT Patent Application No. PCT/CN 2015/096197, filed on Dec. 2, 2015, which claims priority to Chinese Patent Application No. 201410801159.3, filed on Dec. 22, 2014, the content of all of which is incorporated herein by reference.

FIELD OF THE INVENTION

The present invention relates to the field of heat-resistant glue roller technology, and, more particularly, to a heat-resistant glue roll structure with discharge through holes thereof.

BACKGROUND

A laminator is a machine used for plastic packaging, which uses a heat-resistant soft glue roll structure having a certain temperature on surface, to roll on and press a surface of a product for laminating, before bonding it after heating, and a plastic packaging process is then complete. A conventional heat-resistant glue roller of the laminator generally comprises two layers of heat-resistant soft glue layers, for example, a patent with patent number 201010609578.9 has disclosed an electric heating glue roll structure, which comprises a shaft, while a heat-resistant soft glue inner layer is sleeved on a surface of the shaft, and an electric heating wire is arranged on a surface of the heat-resistant soft glue inner layer, followed by covering a layer of heat-resistant soft glue (outer) layer onto the electric heating wire, while between the heat-resistant soft glue inner layer and a heat-resistant soft glue outer layer, it is adhered by a heat-resistant glue. After a long time use of such a heat-resistant glue roller, a plurality of air bubbles may be generated both between the heat-resistant soft glue inner and outer layers and between the heat-resistant soft glue inner layer and the shaft, which are hard to be discharged and may expand after heating, on one hand, it may impact a tightness of bonding between the heat-resistant soft glue inner and outer layers, resulting in separating the heat-resistant soft glue inner and outer layers, and reducing a work reliability of the heat-resistant glue rollers; on other hand, a presence of bubbles may cause a various thickness on surface of the heat-resistant glue roller, which seriously affects a quality of the plastic packaging.

Therefore, the current technology needs to be improved and developed.

BRIEF SUMMARY OF THE DISCLOSURE

According to the above described defects, the purpose of the present invention is providing a heat-resistant glue roll structure with discharge through holes thereof, in order to solve the technical problems in the prior arts that an existing heat-resistant glue roller is easy to generate air bubbles but hard to discharge them out.

In order to achieve the above mentioned goals, the technical solution of the present invention to solve the technical problems is as follows:

a heat-resistant glue roll structure with discharge through holes, comprises a shaft and a heating structure, wherein, the shaft is sleeved with a high-temperature resistant insulation layer on the surface thereof, and a plurality of discharge through holes are arranged in the high-temperature resistant insulation layer, which communicate the outer and inner surfaces of the high-temperature resistant insulation layer; the surface of the high-temperature resistant insulation layer further has a heat-resistant soft glue outer layer sleeved.

The heat-resistant glue roll structure with discharge through holes, wherein, the plurality of discharge through holes have a hole diameter at an end on the outer surface of the high-temperature resistant insulation layer larger than that at an end on the inner surface of the high-temperature resistant insulation layer.

The heat-resistant glue roll structure with discharge through holes, wherein, a centerline of the discharge through hole is arranged deviate from a center of the high-temperature resistant insulation layer.

The heat-resistant glue roll structure with discharge through holes, wherein, the heating structure is an electric heating wire, a spiral mounting groove is set on the surface of the high-temperature resistant insulation layer, and the electric heating wire is wounding and rolling in the spiral mounting groove; a mounting surface is formed between adjacent two spiral mounting grooves, on which the plurality of discharge through holes are arranged.

The heat-resistant glue roll structure with discharge through holes, wherein, both sides of the spiral mounting groove are set into circular arc faces.

The heat-resistant glue roll structure with discharge through holes, wherein, the high-temperature resistant insulation layer includes two clamped high-temperature resistant insulators, which has a buckle set on a connecting end face.

The heat-resistant glue roll structure with discharge through holes, wherein, the high-temperature resistant insulation layer includes two clamped high-temperature resistant insulators, which has a screw fixing pin arranged on an inner surface, while a fixing hole is arranged on the shaft, and the screw fixing pin is inserted into the fixing hole for fixation.

The heat-resistant glue roll structure with discharge through holes, wherein, a positioning and fastening groove for fixing the heat-resistant soft glue outer layer is arranged on the surface of the high-temperature resistant insulation layer, and the positioning and fastening groove is arranged parallel to a central axis of the high-temperature resistant insulation layer.

The heat-resistant glue roll structure with discharge through holes, wherein, either end of the shaft further has a fixing sleeve for fastening the two high-temperature resistant insulators.

Benefits: the present invention provides a plurality of discharge through holes in the high-temperature resistant insulation layer, when air bubbles are generated both between the high-temperature resistant insulation layer and the heat-resistant soft glue outer layer and between the high-temperature resistant insulation layer and the shaft, they would be squeezed or expanded by heat to move towards the plurality of discharge through holes and be discharged therefrom. No air bubbles would be accumulated in the heat-resistant glue roll structure of the present invention. Therefore, the internal structure thereof is stable in structural connection and the structure has long serving life, high stability, high safety and reliability.

DETAILED DESCRIPTION OF EMBODIMENTS

In order to make the purpose, technical solution and the advantages of the present invention clearer and more explicit, further detailed descriptions of the present invention are stated here, referencing to the attached drawings and some preferred embodiments of the present invention. It should be understood that the detailed embodiments of the invention described here are used to explain the present invention only, instead of limiting the present invention.

Embodiment 1

Figure 1:
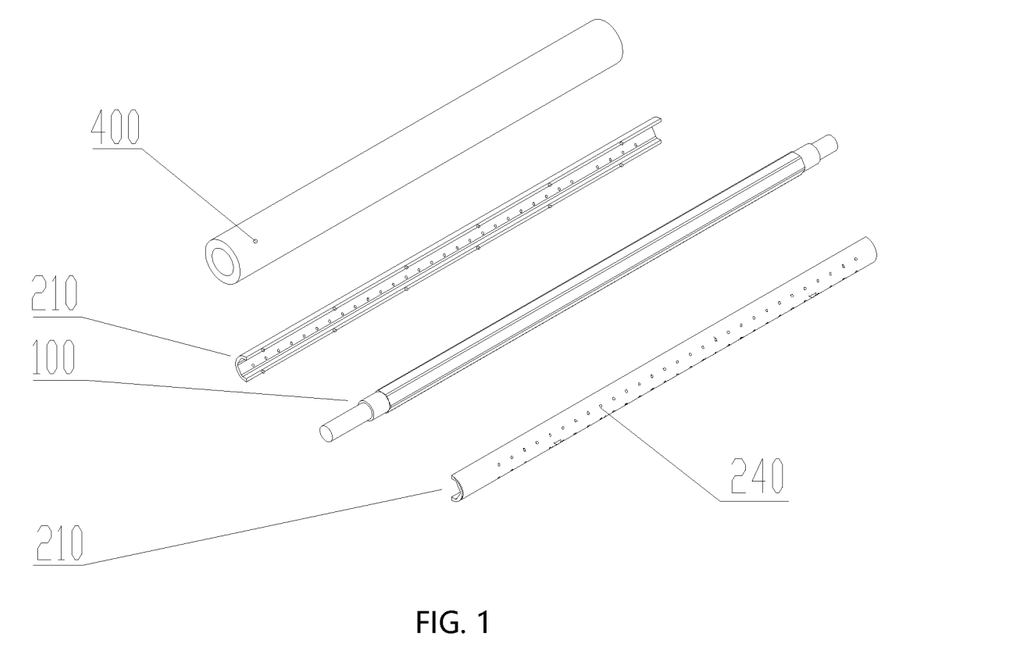
FIG. 1 illustrates an exploded view of a heat-resistant glue roller as provided in the present invention.
Figure 2:
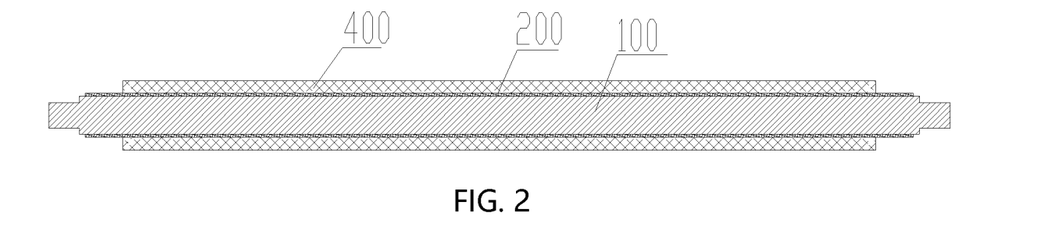
FIG. 2 illustrates a cross-sectional view of a heat-resistant glue roller as provided in the present invention.
Figure 3:
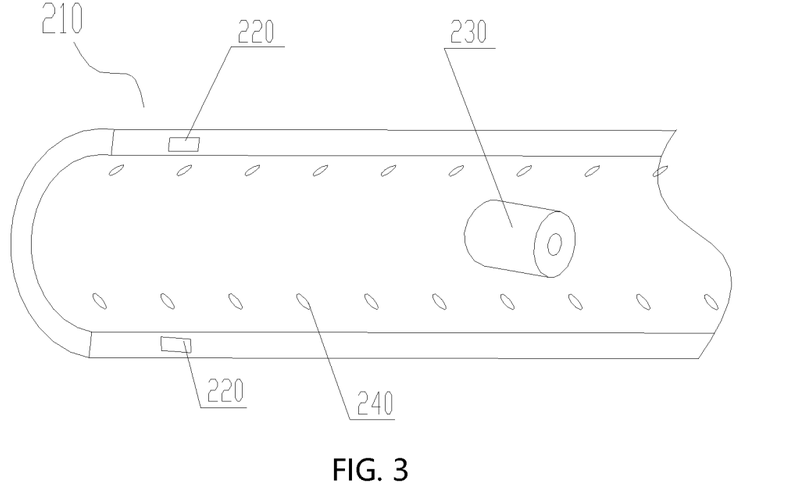
FIG. 3 illustrates a local enlarged schematic view of an inner surface of a high-temperature resistant insulator.

The present embodiment discloses a heat-resistant glue roll structure with a plurality of discharge through holes thereof, shown as FIG. 1 and FIG. 2, it comprises a shaft 100 and a heating structure (not shown in the FIGs.), the shaft 100 is sleeved with a high-temperature resistant insulation layer 200 on the surface thereof, a plurality of discharge through holes 240 are further arranged on the high-temperature resistant insulation layer 200, which communicates the outer and inner surfaces of the high-temperature resistant insulation layer 200 (referencing to FIG. 3); a surface of the heat-resistant insulation layer 200 has a heat-resistant soft glue outer layer 400 sleeved and bonded by a high-temperature resistant glue. A difference between the present embodiment and a conventional heat-resistant glue roller is, the present embodiment arranges a plurality of discharge through holes 240 in the high-temperature resistant insulation layer 200, when a plurality of air bubbles are generated both between the high-temperature resistant insulation layer 200 and the heat-resistant soft glue outer layer 400 and between the high-temperature resistant insulation layer 200 and the shaft 100, they would be squeezed or expanded by heat, during the heat-resistant glue roller working, and would permeate towards the plurality of discharge through holes 240 before being discharged therefrom, without being accumulated in the heat-resistant glue roller. In the present embodiment, using the high-temperature resistant insulation layer 200 instead of any conventional heat-resistant soft glue inner layer is due to a high processing requirement and a high cost of manufacturing a plurality of through holes in the heat-resistant soft glue layer, while a hardness of the heat-resistant soft glue layer is relatively low, and easy to get soften after heating, causing the plurality of discharge through holes easy to get deformed, and a none ideal discharge effect. The high-temperature resistant insulation layer 200 in the present embodiment is a PPS plastic layer. Of course, in other real implementations, the high-temperature resistant insulation layer 200 may also be made by adopting any known other high-temperature resistant insulation materials, such as PAEK, PEEK, PU, PAEEK, and else.

In the present embodiment, the heating structure is adopting an external radiant heating method, such as a heating tube, a mica sheet or else, the heating tube is fixed on outside of the heat-resistant soft glue outer layer 400, using heat radiation to heat up the heat-resistant soft glue outer layer 400. The heat-resistant soft glue outer layer 400 in the present embodiment is a silica gel layer.

Further, since an efficiency of one time molding of the high-temperature resistant insulation layer 200 and the shaft 100 is very low, thus, a structure of the high-temperature resistant insulation layer 200 is changed, by adopting a high-temperature resistant insulation layer 200 structure in a clamping way, which is composed by two high-temperature resistant insulators 210 in a snap-in way (referencing to FIG. 1). A plurality of fixing and connecting methods on the two high-temperature resistant insulators 210 may be adopted, for example, setting a buckle 220 at a connecting end face of the high-temperature resistant insulator 210 (referencing to FIG. 3), and the two high-temperature resistant insulators 210 are connected by the buckles 220. Also, for example, arranging a screw fixing pin 230 on an inner surface of the high-temperature resistant insulator 210 (referencing to FIG. 3), and arranging a fixing hole in the shaft (not shown in the FIGs.), while the screw fixing pin 230 is inserted into the fixing hole and gets fixed, followed by tightening with nuts, such a structure may not only ensure that the high-temperature resistant insulation layer 200 and the shaft 100 have no relative rotations occur, also, enough gaps are left between each other for discharge. Of course, in a real implement, the buckle 220 and the screw pin 230 may be set together. In any real implementations, the shaft 100 may be a cylinder, a cuboid, a multilateral pillar or else, the high-temperature resistant insulation layer 200 needs to be set following a detailed shape of the shaft 100.

Figure 4:
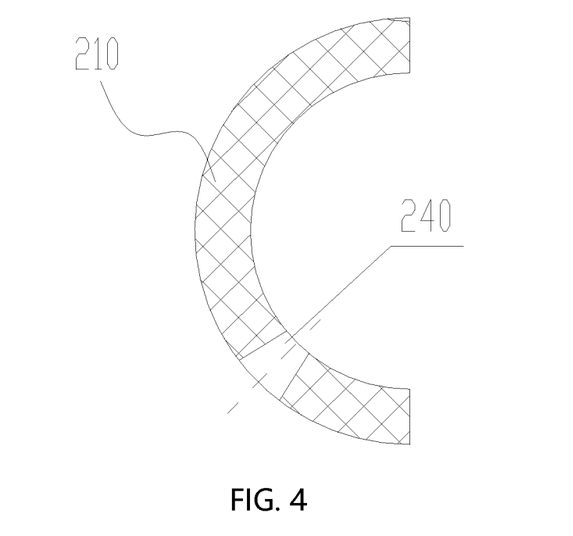
FIG. 4 illustrates a cutaway view of a discharge through hole with a centerline passing through a center of a high-temperature resistant insulation layer.
Figure 5:
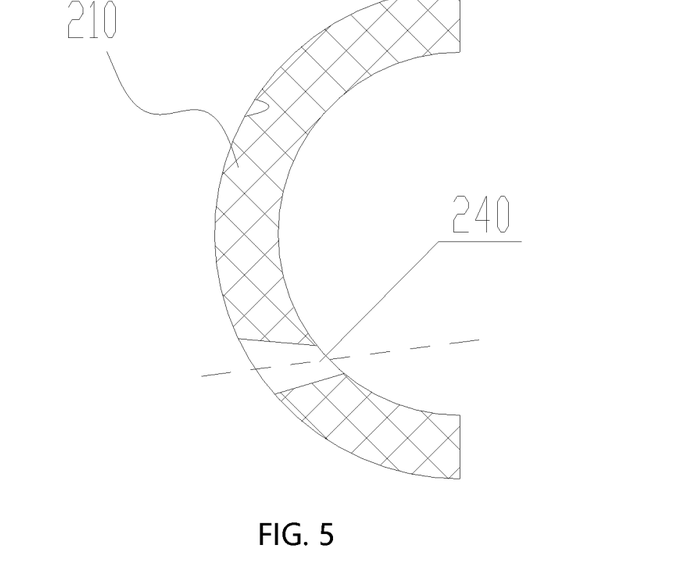
FIG. 5 illustrates a cutaway view of a discharge through hole with a centerline deviate from a center of a high-temperature resistant insulation layer.

In a real implementation, it is not preferable on a discharge effect of simply setting a plurality of discharge through holes 240 in the high-temperature resistant insulation layer 200, because the heat-resistant soft glue outer layer 400 could easily block the plurality of discharge through holes 240, thus, the present invention has studied a plurality of structures of the plurality of discharge through holes, and has found that, when a hole diameter of the discharge through hole at an end on the outer surface of the high-temperature resistant insulation layer is larger than that at an end on the inner surface of the high-temperature resistant insulation layer (as shown in FIGS. 4 and 5), the discharge effect will be pretty good, and not easy to get impacted by the heat-resistant soft layer 400. Also, in order to reduce a difficulty in machining the plurality of discharge through holes 240, in any real practices, generally a structure of the discharge through hole as shown in FIG. 5 is adopted, that is, a centerline of the discharge through hole 240 is set deviate from the center of the high-temperature resistant insulation layer 200, a hole mold structure for such a discharge through hole structure is simple, owns a high processing efficiency, without affecting the discharge effect.

Embodiment 2

A structure of the heat-resistant glue roller in the present embodiment is basically similar to that in the embodiment 1, except that, the shaft 100 in the present embodiment is set hollow inside, while the heating tube is fixed inside the shaft 100, and the hollow shaft 100 is heated by the heating tube before conducting heat to the heat-resistant soft glue outer layer 400 for heating; in the present embodiment, the high-temperature resistant insulation layer 200 is a Teflon material layer.

Embodiment 3

Figure 6:
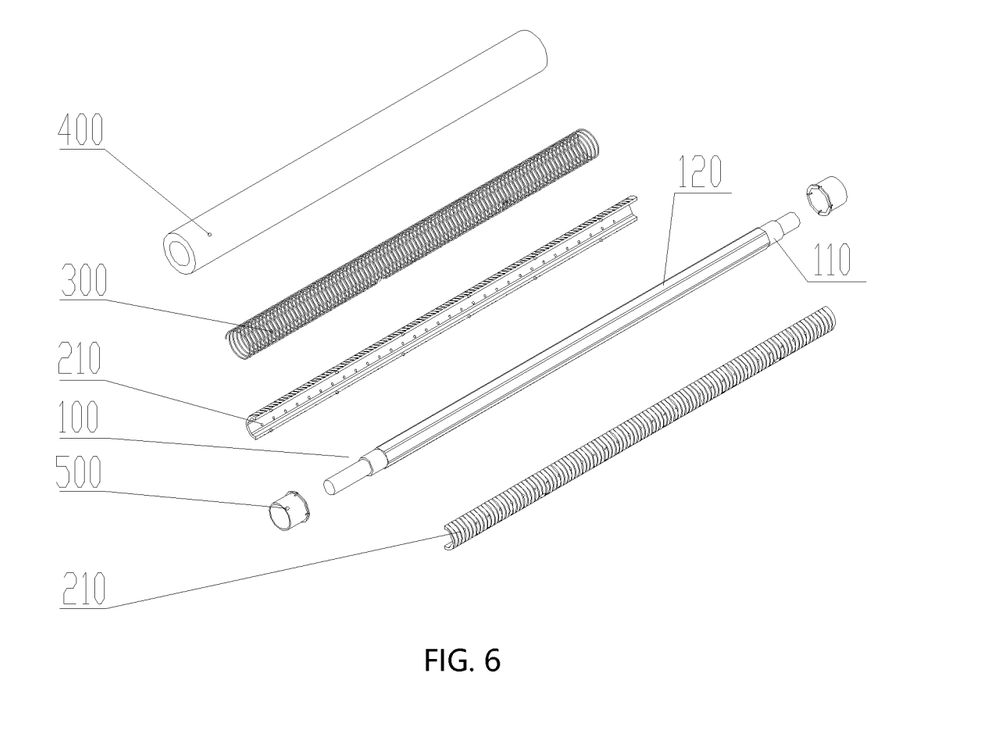
FIG. 6 illustrates an exploded view of a heat-resistant glue roller with a heating structure of an electric heating wire.
Figure 7:
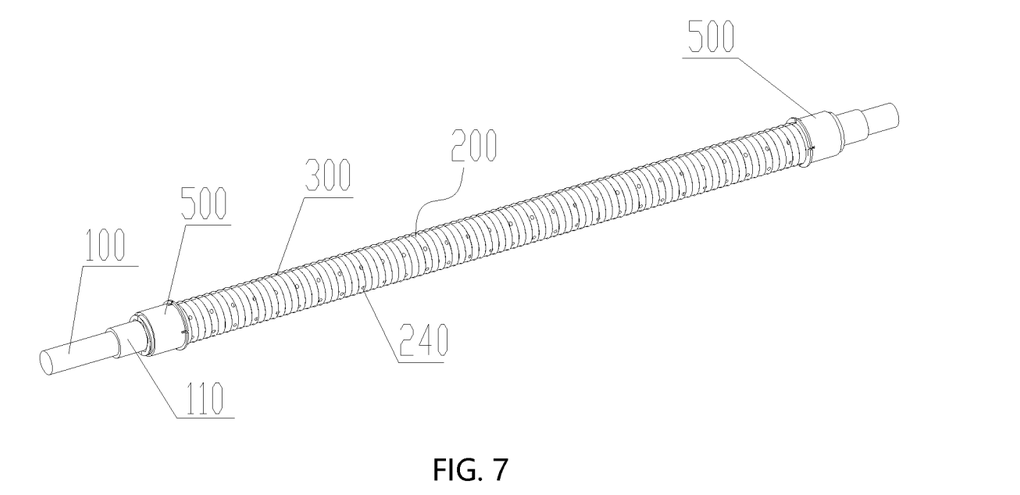
FIG. 7 illustrates a structural schematic view of a heat-resistant glue roller with an electric heating wire lack of a heat-resistant soft glue outer layer.

The heat-resistant glue roll structure in the present embodiment is basically similar to that in the embodiment 1, except that in the present embodiment, the heating structure is adopting an electric heating wire. Shown as FIGS. 6-8, a spiral mounting groove 250 is arranged on the surface of the high-temperature resistant insulation layer 200, while the electric heating wire 300 is also set in a spiral shape, wounding and rolling in the spiral mounting groove 250 (shown as FIG. 7). Two fixing sleeves 500 are arranged at both ends of the shaft 100, which may be a steel sleeve, and has two functions, one is used as a conductive part for the electric heating wire 300, connecting it to a power source before heating it up; another is applied to tightening the high-temperature resistant insulator 210. The fixing sleeves 500 cover both ends of the high-temperature resistant insulator 210 and connect to the electric heating wire 300, when mounted to a laminator, the electric heating wire 300 is connected by a carbon brush or other connection methods to the fixing sleeves 500 through a sliding connection, and gets powered up before generating heat, to heat up the heat-resistant soft glue outer layer 400. In a real implement, either end of the shaft 100 is arranged with a mounting boss 110 (referencing to FIGS. 6 and 7), two high-temperature resistant insulators 210 are clamped on the surface of the shaft 100, while both ends of the high-temperature resistant insulator 210 extend out of a shaft body 120 of the shaft 100, and the fixing sleeves 500 are mounted on both ends of the high-temperature resistant insulator 210 (specifically corresponding to a position of the mounting boss 110 near the shaft body 120), an effect after installation may be referred to FIG. 7. Tiny gaps are existing between the mounting boss 110 (or an outer port of the fixing sleeve 500) and the high-temperature resistant insulator 210, which helps for gas discharge, when an air bubble is squeezed or expanded by heat, it may be discharged from inside out, while air from outside may be hard to enter the inside of the heat-resistant glue roller.

Figure 8:
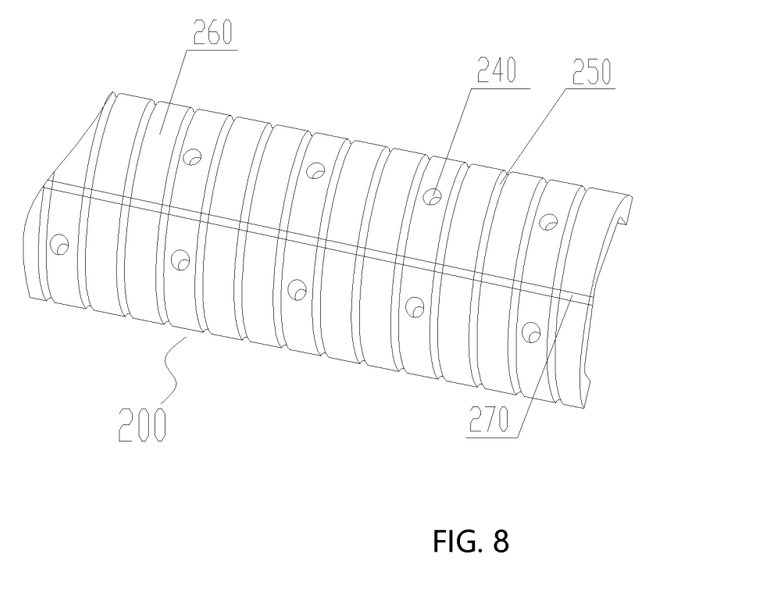
FIG. 8 illustrates a local enlarged schematic view of an outer surface of a high-temperature resistant insulation layer with spiral mounting grooves.
Figure 9:
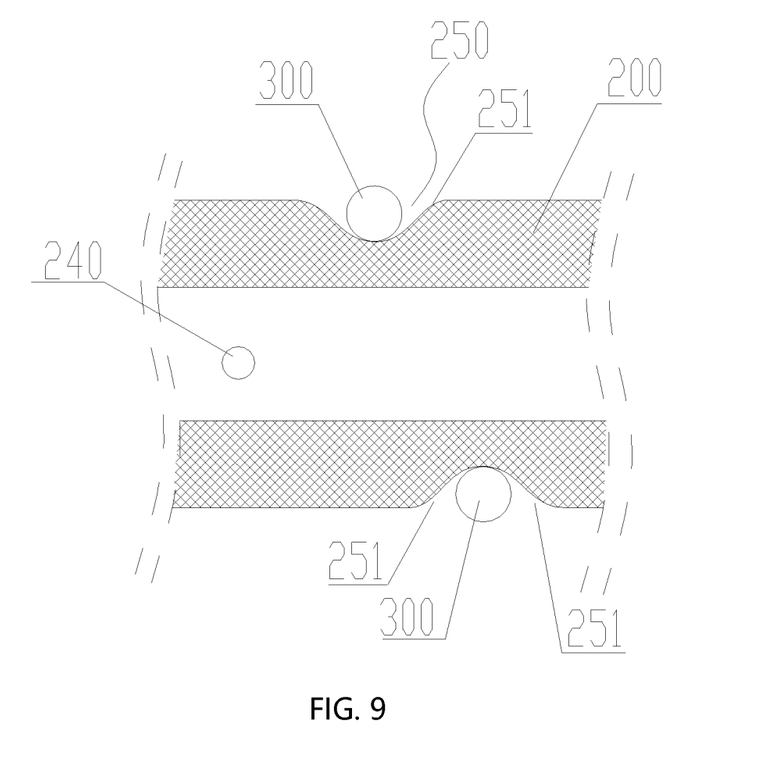
FIG. 9 illustrates a cross-sectional view of a spiral mounting groove.

Shown as FIG. 8, a mounting surface 260 is formed between adjacent two spiral mounting grooves 250, on which the plurality of discharge through holes 240 are arranged. In a real implementation, 3~8 of the plurality of discharge through holes 240 are generally arranged on the mounting surface 260, which has generally a width of 2 mm, while an outer diameter of the plurality of discharge through holes 240 is 1.8 mm, and an inner diameter is 1.0 mm, in such an installation method, on one hand, an arrangement of the plurality of discharge through holes 240 will not affect the original heat-resistant glue roll structure, on the other hand, an effect and efficient of gas discharge may be maximally improved. In a real implementation, both sides of the spiral mounting grooves 250 are set into circular arc faces 251 (referencing to FIG. 9), such an arrangement of a structure of circular arc face 251, on one hand, may improve an efficient of heat transfer, on the other hand, may be more convenient for gas discharge (which is because the electric heating wire 300 is the easiest place to generate air bubbles, while setting the circular arc face 251 may increase a contact surface between both sides of the spiral mounting grooves 250, which is more helpful for the air bubbles to permeate to the plurality of discharge through holes on both sides).

In a real implementation, a positioning and fastening groove 270 for fixing the heat-resistant soft glue outer layer 400 is arranged on the surface of the high-temperature resistant insulation layer 200 (referencing to FIG. 8), and the positioning and fastening groove 270 is arranged parallel to a central axis of the high-temperature resistant insulation layer. When bonding the heat-resistant soft glue outer layer 400 and the high-temperature resistant insulation layer 200 together, part of an embossment in the inner surface of the heat-resistant soft glue outer layer 400 will be trapped into the positioning and fastening groove 270, which not only improves a stability of a combination of the two, but also ensures the two hard to occur any relative movements, even after the glue is aging, thus a reliability of the heat-resistant glue roller is improved, and a serving life is extended.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. A heat-resistant glue roll structure with discharge through holes, comprising:
   a shaft and a heating structure, wherein the shaft is sleeved with a high-temperature resistant insulation layer, and a plurality of discharge through holes are arranged in the high-temperature resistant insulation layer, which communicate an outer surface and an inner surface of the high-temperature resistant insulation layer; the outer surface of the high-temperature resistant insulation layer further has a heat-resistant soft glue outer layer sleeved; and a positioning and fastening groove for fixing the heat-resistant soft glue outer layer is arranged on the surface of the high-temperature resistant insulation layer, the positioning and fastening groove being arranged parallel to a central axis of the high-temperature resistant insulation layer.

2. The heat-resistant glue roll structure with discharge through holes according to claim 1, wherein the plurality of discharge through holes have a hole diameter at an end on the outer surface of the high-temperature resistant insulation layer larger than that at an end on the inner surface of the high-temperature resistant insulation layer.

3. The heat-resistant glue roll structure with discharge through holes according to claim 2, wherein a centerline of the discharge through hole is arranged deviate from a center of the high-temperature resistant insulation layer.

4. The heat-resistant glue roll structure with discharge through holes according to claim 1, wherein the heating structure is an electric heating wire, a spiral mounting groove is set on the surface of the high-temperature resistant insulation layer, and the electric heating wire is wounding and rolling in the spiral mounting groove; a mounting surface is formed between adjacent two spiral mounting grooves, on which the plurality of discharge through holes are arranged.

5. The heat-resistant glue roll structure with discharge through holes according to claim 4, wherein both sides of the spiral mounting groove are set into circular arc faces.

6. The heat-resistant glue roll structure with discharge through holes according to claim 1, wherein the high-temperature resistant insulation layer includes two clamped high-temperature resistant insulators, which has a buckle set on a connecting end face.

7. The heat-resistant glue roll structure with discharge through holes according to claim 1, wherein the high-temperature resistant insulation layer includes two clamped high-temperature resistant insulators, which has a screw fixing pin arranged on an inner surface, while a fixing hole is arranged on the shaft, and the screw fixing pin is inserted into the fixing hole for fixation.

8. The heat-resistant glue roll structure with discharge through holes according to claim 6, wherein either end of the shaft further has a fixing sleeve for fastening the two high-temperature resistant insulators.

* * * * *